UNITED STATES PATENT OFFICE.

FRIEDRICH BRAN AND GABRIEL VAN OORDT, OF MANNHEIM, GERMANY.

PROCESS OF SEPARATING BERYLLIA FROM ALUMINA AND IRON.

No. 854,560.  Specification of Letters Patent.  Patented May 21, 1907.

Application filed July 13, 1906. Serial No. 326,144.

*To all whom it may concern:*

Be it known that we, FRIEDRICH BRAN, residing at Mannheim, in the Grand Duchy of Baden and Empire of Germany, subject of the Emperor of Germany, and GABRIEL VAN OORDT, residing at Mannheim, in the Grand Duchy of Baden and Empire of Germany, subject of the Queen of the Netherlands, have invented certain new and useful Improvements in and Relating to a Process of Separating Beryllia from Alumina and Iron, of which the following is a specification.

The object of the present case is to devise a simple, cheap and ready process of separating beryllia, sometimes called glucina, from alumina and also from iron oxid by treating a mixture of the oxids with carbon dioxid, or bicarbonates, to dissolve beryllia while leaving alumina and iron oxid undissolved.

It is known that all forms of alumina precipitated from acid solutions if substantially pure hydrated alumina, are easily soluble in acids, even if weak or dilute, as for instance, acetic acid, while still fresh; that is, before they have been transformed into the so-called "aged forms" by time, heat or chemical agents. Similar precipitates of beryllia under like conditions pass more quickly into these aged forms; that is, into forms which are difficultly soluble in acids and alkalies. On this fact a separate method of separation is based.

As the result of experiment, it has been proved that un-aged forms of alumina and beryllia hydrates, that is forms still easily soluble in acids, respectively exhibit different behaviors toward acids and acid salts, particularly toward carbonic acid and its acid salts; this difference depending upon the different basicities and valencies of the hydroxids. The differences between these two hydrates in their reactions with, or solubilities in, acids and acid salts are still further accentuated if they have been obtained by decomposing their solutions in caustic alkali by means of carbon dioxid. This differential behavior is especially marked as regards their reaction with carbonic acid or the bicarbonates, especially sodium bicarbonate.

When a mixture of alumina and beryllia hydrates, with some ferric hydrate, is precipitated from a caustic soda solution at 40° C by carbon dioxid, or from a solution of the salts by heated alkali solution, all the beryllia and iron and considerable alumina are extracted from the precipitate by treatment with sulfuric acid of 10° B, with 10 per cent hydrochloric acid or with 10 per cent acetic acid, while from the same precipitate carbonic acid and bicarbonate dissolve only the beryllia with but traces of iron and no alumina.

Herzfeld and Korn (*Chemie der seltenen Erden*, page 163) and C. Glaser (*Chemische Zeitung*, 1896, page 612) state that when salts of beryllia are precipitated by carbonate of sodium or bicarbonate, the precipitate is only very difficultly soluble in carbonic acid in great excess, even when carbon dioxid is passed into the precipitation. Our experience is to the contrary. We have found that precipitated beryllium hydroxid and the so-called basic carbonates of beryllium are easily soluble in bicarbonates of alkali, with or without excess of carbon dioxid, or in the carbonates if carbon dioxid be passed into the liquid. The maximum of solubility is obtained when a molecule of the alkali $M_2O$, is present for every molecule of beryllia. Other proportions may be used, but not so well, as involving either an unnecessary excess of alkali, or the possibility of some beryllia remaining undissolved.

While the statements from the cited authorities would preclude the possibility of a separation of alumina from beryllia by any such reaction, (since the alleged behavior of beryllia is practically that of alumina under such circumstances), as a matter of fact we have found that the difference in behavior of the two is such as to allow a simple, cheap and ready process for their separation to be predicated upon it; a process resulting in a separation which is not only technically useful but quantitative. For this separation, alkali is employed, together with carbon dioxid, in such proportion as to obtain a carbonated compound wherein the alkali and beryllia are in the ratio of $M_2O:BeO$. This carbonated compound is soluble in water and is new to chemistry. To obtain it, the beryllium hydroxid is treated either with an alkaline bicarbonate, such as sodium bicarbonate, in the correct proportion, or with an alkaline carbonate in solution, passing into the solution a stream of carbon dioxid. Carbon dioxid may be employed with the bicarbonate.

In performing the separation of beryllia from alumina, if the two hydroxids have been precipitated together they may be treated with bicarbonate, with or without addition of carbon dioxid, or with carbonate and carbon dioxid. The beryllia dissolves as the new compound. Or a saline solution of the two oxids may be treated with sufficient alkali to neutralize the combined acid and also with enough more carbonated alkali and, if necessary, carbon dioxid, to furnish the stated compound with beryllia. Beryllia will remain in solution and alumnia precipitate. A solution of the two hydroxids in caustic alkali when treated with carbon throws down alumina.

As example of processes according to our invention may be adduced the following:

1. A mixture of hydroxids of iron, aluminium and beryllium, containing 4 parts of the iron oxid, 20 parts alumina and 10 parts beryllia, was treated with 100 parts by volume of a caustic soda solution. The solution was then filtered off undissolved ferric hydrate and treated with carbon and bicarbonate of sodium till all soda or carbonate, had been transformed into bicarbonate. Alumina and iron were thrown out and beryllia remained dissolved. The solution was separated from the precipitate. From it the beryllia could be thrown down by heating, diluting or addition of alkali.

2. A similar mixture of hydroxids was treated with 62 or more parts of carbonate of sodium and enough water to make a double or triple normal solution. Into the mixture of carbonate solution and hydroxids, carbon dioxid was passed until all the carbonate was converted into bicarbonate, the resulting solution of the new beryllium compound separated from undissolved matters, as by filtration, and the beryllia regained in solid form by heating, dilution or alkalization.

3. The same result was obtained by directly treating the same mixture of hydroxids with 88.6, or more, parts of sodium bicarbonate in saturated aqueous solution, either with or without passing more carbon dioxid into the solution. Filtration gave a solution of the new compound.

With any of these methods, if the mixture of hydroxids was employed in excess, relative to the amount of alkali present, the solution filtered off from undissolved matters contains only the new beryllium compound, a carbonated salt of alkali and beryllia with the ratio of $M_2O:BeO::1:1$; the symbol M designating either K or Na.

The new compound is freely soluble in water and its aqueous solution yields a precipitate upon heating, upon dilution, or upon addition of alkali or strong acid.

What we claim is:—

1. The process of separating beryllia from alumina and iron which consists in treating a mixture containing the same with alkali and carbon dioxid, said alkali being employed in amount sufficient to yield a carbonated compound with the beryllia present wherein the ratio $M_2O:BeO$ subsists.

2. The process of separating beryllia from alumina and iron which consists in treating a mixture containing the same with a solution containing an alkali and carbon dioxid, said alkali being employed in amount sufficient to yield a compound with the beryllia present wherein the ratio $M_2O:BeO$ subsists, and separating the resultant solution from undissolved matters.

3. The process of separating beryllia from alumina and iron which consists in treating a mixture containing the same with an alkali and sufficient carbon dioxid to form a bicarbonate with said alkali, dissolving the resultant beryllium compound and separating the solution from undissolved matters.

4. The process of forming a new beryllium compound which consists in treating beryllium hydroxid with alkali and carbon dioxid, said alkali being employed in amount sufficient to form the ratio $M_2O:BeO$ with the beryllia.

5. The process of forming a new beryllium compound which consists in treating beryllium hydroxid with dissolved alkali and carbon dioxid, said alkali being employed in amount sufficient to form the ratio $M_2O:BeO$ with the beryllia.

6. The process of forming a new beryllium compound which consists in treating beryllium hydroxid with an alkali bicarbonate, said bicarbonate being employed in such an amount that the contained alkali is sufficient to form the ratio $M_2O:BeO$ with the beryllia.

7. As a new composition of matter, a soluble carbonated compound containing alkali and beryllia in the ratio of $M_2O:BeO$, said compound being soluble in water and its aqueous solution giving a precipitate of beryllium hydroxid when heated, diluted, or treated with alkalies.

In testimony whereof we hereunto affix our signatures in the presence of two witnesses.

FRIEDRICH BRAN.
GABRIEL VAN OORDT.

Witnesses:
H. W. HARRIS,
JOS. H. LEUTE.